Sept. 24, 1957 E. E. JONES 2,807,092
CHECKING ASSEMBLY
Filed Nov. 12, 1954 2 Sheets-Sheet 2

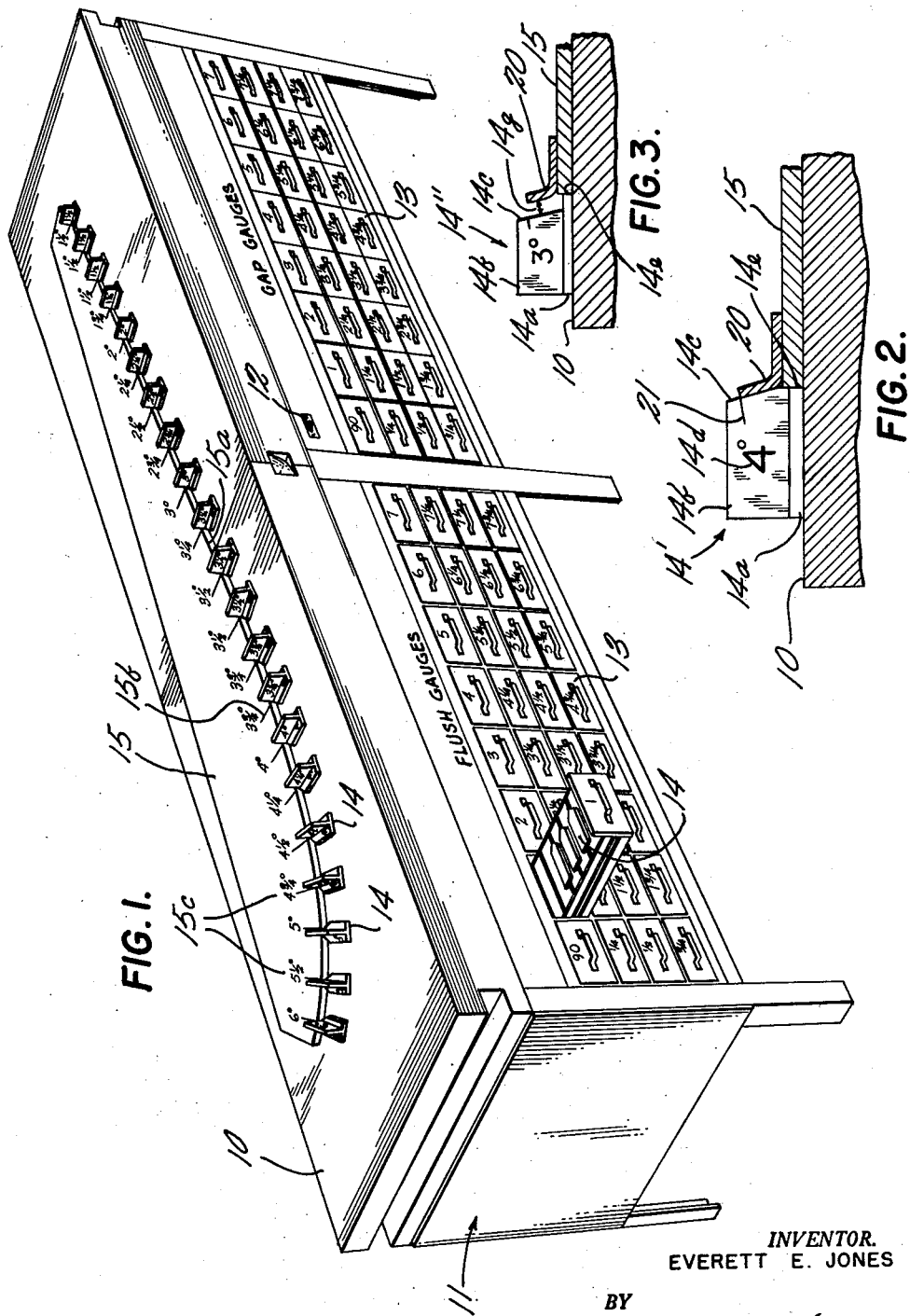

INVENTOR.
EVERETT E. JONES
BY
Campbell, Brumbaugh, Free & Graves
his ATTORNEYS

United States Patent Office 2,807,092
Patented Sept. 24, 1957

2,807,092

CHECKING ASSEMBLY

Everett E. Jones, Hagerstown, Md., assignor to Fairchild Engine and Airplane Corporation, Hagerstown, Md., a corporation of Maryland Application November 12, 1954, Serial No. 468,406

16 Claims. (Cl. 33—174)

This invention relates to a method and apparatus for inspecting fabricated parts to determine if they are within prescribed limits of precision to insure that they will mate with other parts to form an assembly.

The individual inspection of parts manufactured in mass production is an expensive and time consuming procedure, especially where relatively intricate shapes and contours are involved which require a great many complicated measurements. Comparison checking, that is to say checking an entire contour, surface or part by placing the same in contact with or in proximity to a pattern, whereby deviations from the prescribed shape, size, or form may be readily distinguished, has been found to be a rapid method of inspecting certain parts, but it is evident that comparison checking is impractical in cases where an excessive number of different patterns would be required.

In the aircraft industry, for instance, it becomes necessary to inspect the accuracy of a large number of aluminum and aluminum alloy parts which ultimately make up a single assembly. Frequently the parts of such assembly, for example, the ribs making up a tapered wing, vary but slightly one fron another in contour, angularity, or measurement. Inspection of these parts by usual comparison methods requires a large number of templets and clamping devices which would make the inspection procedure quite cumbersome.

The principal object of the present invention is to simplify and improve comparison inspection procedures, and particularly to make it possible to employ the same equipment for the inspection of different parts, rather than requiring a different three dimensional pattern for each part. The equipment employed in the present invention includes a table or platform, a templet having an edge with a contour identical to the contour of one side of the surface of the part to be checked, a plurality of different standard gauge members, each having a checking edge or surface formed thereon, and means for anchoring the gauges, as well as the templet if desired, to the surface of the table or platform.

The checking edges or surfaces of the gauges preferably are parallel to the edge or surface of the part to be checked at a given location. The checking edges of some of gauges are adapted to abut the edge or surface of the part to be checked, whereas the checking edges of others are adapted to be spacially separated therefrom to form a gap in connection with which a "go-no go" gauge may be employed. The general contour of a surface of a part may be conveniently checked with this equipment by magnetically anchoring the templet and/or the gauge members upon the surface of the table, the gauge members being positioned adjacent the said edge of the templet at the appropriate location to form, with the templet, a skeleton pattern of the surface of the part to be checked. Thus, the vertically disposed gauge members present, above and adjacent to the operative edge of the templet, an outline of the surface of the part so that the part to be checked can be positioned upon the templet with the surface to be checked placed in abutting contact with the checking edges or surfaces of the gauge members which are intended to be in abutting contact therewith. The checking edges or surfaces of the remaining gauges are intended to be spacially separated from the surface of the part to be checked and present a gap of a width equal to the largest tolerance that would be expected in the inspection work for which the equipment is to be used. The part will be passed in inspection if the gap receives the "go" portion and rejects the "no-go" portion of a "go-no go" gauge.

Various means may be employed for anchoring the gauges, and the templet if desired, to the platform prior to the inspection procedure. For example, the anchoring forces may be achieved by magnetism, including electromagnetism, or by suction. The use of magnetic attraction for anchoring the templet and gauges initially in operative fixed positions upon the inspection surface is particularly applicable for the checking of parts fabricated from a material which is relatively resistant to magnetization, so that the part may be readily manipulated and moved relative to the pre-set templet and gauge members.

The present invention will be more fully understood by reference to the description of the invention which follows and the accompanying drawings in which:

Figure 1 is a perspective view of the equipment employed in practice of the present invention wherein the templet and gauges are adapted to be anchored on the inspection surface by magnetism;

Figure 2 is a cross-section view of certain of the apparatus shown in Figure 1, illustrating the manner in which the fabricated part is positioned initially for inspection in contact with the edges of certain of the gauges;

Figure 3 is a view similar to Figure 2 showing the gaps between other of the gauges and the parts to be checked;

Figure 4:
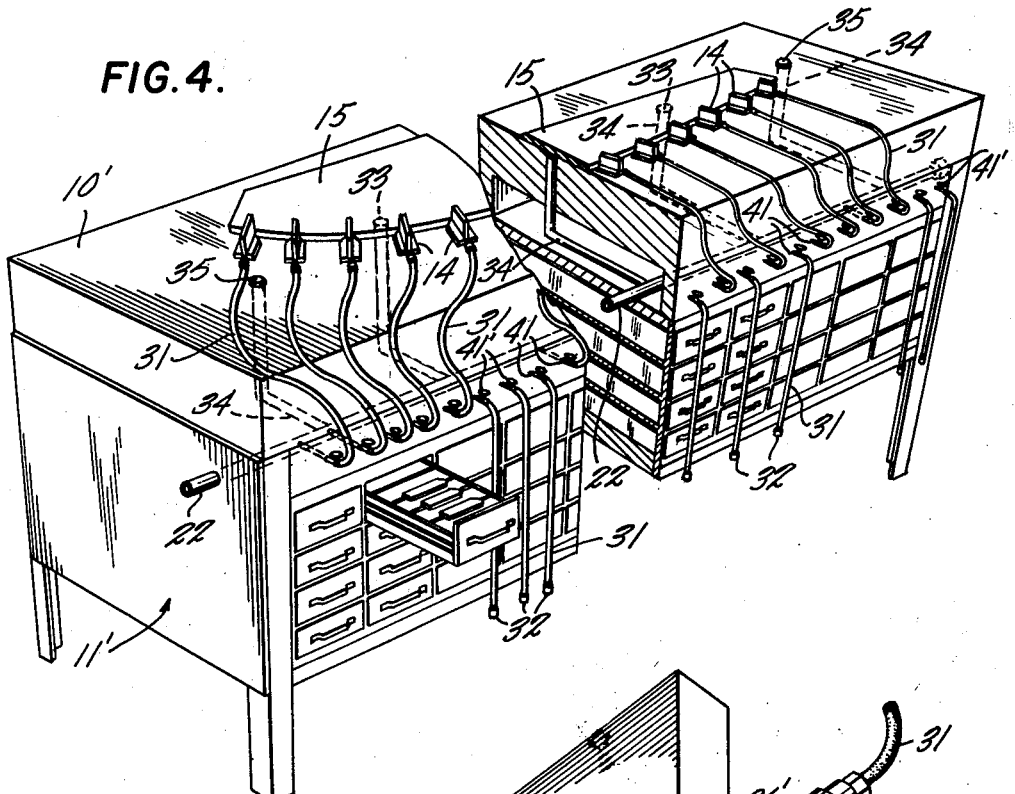
Figure 4 is a perspective view similar to Figure 1 of another embodiment of the invention wherein the templet and checking gauges are adapted to be anchored in fixed position on the inspection surface by suction.

Referring to Figure 1 of the drawing, the inspection of parts in accordance with one embodiment of the present invention is made on top of an electro magnetic surface or platform 10 of a table 11. The magnetization of the surface 10 of the table is produced by electric coils hidden beneath the surface of the table, and the flow of electric current through the coils is controlled by an on-off switch 12. When the switch 12 is in the "off" position, the surface 10 is demagnetized.

The table has provision for a great many sliding drawers 13, and these drawers serve as storage compartments for different inverted-T gauge members 14 which will be described in greater detail below.

In the practice of the present invention, a flat steel templet 15 is employed in combination with the gauge members 14. The templet 15 has a vertical edge 15a having a contour identical to the finished shape of the part to be checked, or more specifically, identical to the shape or contour of one edge of the part.

The upper surface of the templet 15 is provided with a series of markings 15b thereon to indicate the exact locations to be checked. Inscribed in the upper surface of the templet 15 at each of the markings 15b is information 15c identifying the particular gauge member which is to be stationed adjacent the marking.

Some of the inverted-T gauge members 14 may be of the flush type, generally represented by the reference character 14' in Figure 2, while the remaining are of the gap type, generally represented by the reference character 14" in Figure 3. Both types comprise generally a steel base 14a, a vertically disposed web portion 14b and a checking edge or surface 14c formed at one end of the web portion 14b. Beneath the operative checking edge 14c is a vertical portion 14e which is adapted to abut the edge of the templet, so that the checking edge 14c is presented above the upper surface of the templet. Indicia 14d identifying the contour of the checking edge or surface 14c is marked on the face of the web. Thus, for example, the gauge member represented in Figure 2 bears the indicia "4°" indicating that the surface makes an angle of 4 degrees with the vertical, whereas the gauge member represented in Figure 3 bears the indicia "3°."

If desired, the faces of the webs 14b of the gauges may have, in addition, markings 21 to indicate the correct height of an edge of the part above its base. Also, the edges or surfaces 14c of the gauges may be of much greater height and/or width to permit them to be used in checking wavy or non-flat parts.

The gauge members 14' and 14" differ principally in that in the case of the former the checking edge 14c is adapted to be in abutting contact with the part 20 to be checked, whereas in the case of the gauge members 14" a gap 14g separates the checking edge 14c and the edge of the part 20 to be checked.

In the practice of the present invention the templet 15 for the particular part to be checked is placed on top of the table 10, and the appropriate gauge members 14 called for by the indicia 15c are selected from the drawers 13. Preferably the drawers 13 are appropriately marked to identify the angle or other contour of the surface 14c. The proper gauge members 14 are positioned adjacent the edge 15a of the templet at the stations indicated by the markings 15b, taking care in each case to see that the marking 14d of the selected gauge member 14 corresponds to the marking 15c inscribed on the templet 15.

Of the gauge members 14 employed, only a few will be of the flush type 14', the remaining majority being of the gap type 14". The flush type 14' serve to facilitate the placing of the part 20 to be inspected in proper position upon the templet 15, hence it may only be necessary to employ a few at spaced apart locations, say, one at each end of the templet and one approximately mid-way therebetween, to permit the part to be properly positioned.

With the templet 15 and all of the gauge members 14 properly set in place on the table, the switch 12 may be thrown to the "on" position to magnetize tabletop 10, thereby securely anchoring the steel templet and all of the gauge members in their pre-set positions. The parts to be checked, represented by the reference numeral 20 in Figure 2, are then placed one at a time on top of the templet with the surface to be checked adjusted to abut the edges 14c of the gauges 14'. In this embodiment of the invention, the part 20 is preferably fabricated from aluminum or of a material which is relatively resistant to magnetization so that it can be easily manipulated and shifted in proper position relative to the surfaces 14c of the angle gauges.

The correct curvature, angularity, etc., of the surface of the part to be checked may then be visually checked at each of the check stations 15b, and if no obvious inaccuracy is detected, the part may be more precisely checked by the use of "go-no go" gauges in conjunction with the gaps of the gap type gauges 14". The gaps 14g of the gauges 14" are preferably equal to the greatest tolerance that would ever be expected in inspection work for which the equipment will be employed. If the "go" portion of the "go-no go" gauge can be inserted in the gap 14g and if the "no go" portion is unable to enter the gap, the part is within the necessary limits and will be passed, otherwise the part will be rejected.

For example, should the gauges be made to present a .050 inch standard gap and the part 20 have an edge which is to be held to a curvature tolerance of ±.010 inch, the "go" portion of the "go-no go" gauge would be .040 inch and the "no go" portion .060 inch. The part would pass inspection if the "go" portion will enter the gap and if the "no go" portion will not enter the gap.

In the inspection of certain parts, of course, it may be sufficient merely to check the curvature of the edge in relation to the checking edges 14c of the gauges 14, and in such procedure it may be preferable to employ either all flush type gauges 14' or all gap type gauges 14".

As soon as all the parts are checked, the switch 12 is thrown to the "off" position which demagnetizes the tabletop 10, releasing the templet and all of the gauge members. A new setup for a different part may then be arranged on the tabletop, or the gauge members returned to the drawers 13 until needed again.

Figure 4 illustrates a modification of the equipment whereby the checking gauges 14 and the templet 15 may be anchored to the checking surface by suction instead of magnetism. The vacuum system while not necessarily the preferred embodiment of the invention, increases the usefulness and versatility of the checking fixture, since it is not limited to the inspection of parts fabricated from materials resistive to magnetization, such as aluminum and certain of its alloys.

The attached Figure 4 illustrates the table 11' as being basically the same as the table 11 of Figure 1, except that the table is provided with a plurality of vacuum outlet nozzles 41 arranged along the front side thereof all of which communicate with a single conduit 22 extending within the table substantially the full length thereof, protruding from one end of the table for connection with a source of vacuum. A suitable manually operable shut-off valve 41' is provided for each nozzle 41.

The tabletop 10' resting on the table 11' is a standard type surface plate having the usual, level, smoothly ground surface for checking purposes, although, of course, and if desired the table may be suitably equipped to operate either as a magnetic or a vacuum system.

The templet 15 of the original disclosure may be used in the present case and, because of its weight, will not shift easily in operation. The gauge members 14 of the original disclosure may be modified for vacuum operation as shown in detail in Figure 5. The underside 30 of base 14a has a trough 23 therein which communicates with a horizontal bore 24 by means of a vertical, drilled hole 25. The open end of bore 24 is threaded at 26 to receive the threaded end of a standard quick-acting coupling adapter 26'.

Figure 5:
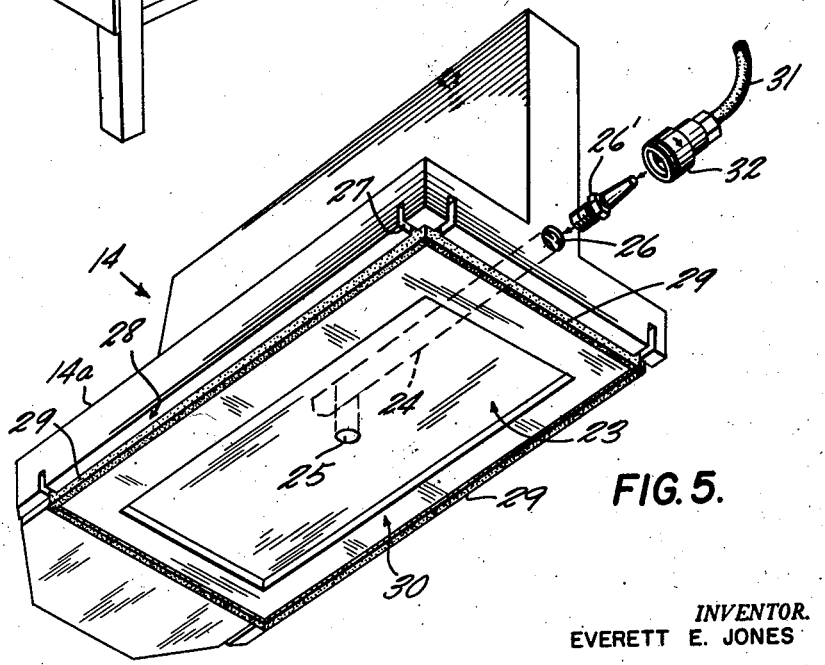
Figure 5 is a perspective view of one of the checking gauges employed in the embodiment illustrated in Figure 4.

The base 14a of the gauge 14, as shown in Fig. 5, is machined to provide four narrow slots 27 near its outer edges and surrounding the trough 23, two running across its width and two running lengthwise. The material of the base between each slot and the adjacent outer edge of the base is cut away at 28 and a seal 29 of resilient material, preferably rubber, is cemented into the slots 27 to completely surround the raised face 30 of the base 14a and the trough 23 formed therein. The lower edge of the seal 29 is curved outwardly to a slight degree so that when held in anchored position on the surface 10' by suction, the lower edge of the seal 29 will be deformed outwardly on all sides.

Each of the outlet nozzles 41 has a convenient length of flexible hose 31 connected thereto which may be connected to any one of the various gauges 14 by means of a quick disconnect check unit 32 affixed to the free end of each hose. The check unit is a commercially available type which mates with the adapter 26' to form an air-tight joint.

In operation the same general procedure is followed as outlined in the original disclosure up to the point of selection of the various gauges 14 from the drawer compartments 13. Each gauge is then connected to a hose by inserting the adapter 26' into the check unit 32 and pushing the two parts together. The gauge is then placed on the tabletop 10' and abutting the edge of the templet 15 at the correct location, at which time the valve 41' in the particular vacuum line being handled is turned to the "on" position which evacuates the air from the trough 23 of the gauge and anchors the gauge in place on the tabletop by suction. Each successive gauge is then properly positioned in the same manner and the parts are then inspected as previously described. When the inspection operation has been completed, each of the valves 41' in the vacuum lines being used is turned to the "off" position, and each hose 31 in use is disconnected from the gauges by a slight turn of the check unit 32 in the direction indicated by the arrow engraved thereon. The gauges may then be removed from the tabletop and restored to their respective drawer locations.

It might be mentioned that while the fixture may be connected to an external source of vacuum when such source is available, if the fixture is to be used in facilities which do not have a source of vacuum, its construction may be modified to incorporate a self contained unit. In such case, the table 11' could contain within its structure in the area immediately to the rear of the sliding drawers an electric motor driving a vacuum pump, the suction port of which would be connected to the conduit 22. In addition, it may be desirable to connect the pump to a reservoir or accumulator which in turn would be connected to the conduit 22 so that continuous operation of the pump would not be necessary while the fixture was in use.

Although the templet 15 would normally be of such size and thickness that its weight would be sufficiently great to prevent its shifting on the tabletop, it is conceivable that in certain cases it may be desirable to provide more secure positioning means. Toward this end the table 10' may be provided with several threaded openings 33, each communicating with the vacuum conduit 22 by conduits 34. The openings may be covered by threaded plugs 35 when not in use. In operation, the threaded plugs would be unscrewed and removed from only those openings that would be covered by the templet when positioned on the tabletop.

The invention has been shown and described in preferred forms and by way of example only, and it is understood that many variations and modifications may be made therein without departing from the spirit of the invention. The invention, therefore, is not to be limited to any particular form or embodiment except insofar as such limitations are set forth in the claims.

I claim:

1. A method of checking the contour and angle of a surface of a part comprising the steps of anchoring a templet upon a checking surface, the said templet having an edge corresponding to the contour of the part to be checked, selecting appropriate angle gauges having upstanding portions extending at specified reference angles from the upper surface of the templet for checking the desired angles at predetermined locations along the contour of the part anchoring said angle gauges adjacent and abutting said edge of the templet at locations marked on the templet, and placing the part to be checked on top of the templet with the angle of the surface to be checked adjacent said gauges, and comparing the contour and angle of the surface of the part in relation to the reference angles of the angle gauges.

2. A method of checking the contour of a part comprising the steps of anchoring a templet upon a checking surface, the templet having an edge corresponding to the contour of the part to be checked, anchoring a plurality of gauges adjacent said edge, said gauges having upstanding portions, the upstanding portions of predetermined gauges being adapted to abut the surface to be checked and the upstanding portions of the remaining gauges being adapted to present a gap with the surface to be checked, placing the part to be checked on top of the templet with the surface to be checked in contact with the upstanding portions of said predetermined gauges, and checking the widths of the gaps between the surface to be checked and the upstanding portions of the other gauges.

3. A method of checking the contour and angle of the surface of a part having a planar surface adjacent the surface to be checked comprising the steps of anchoring a templet having a planar upper surface upon a checking surface, said templet having an edge corresponding to the contour of an edge of the part to be checked, selecting appropriate angle gauges having upstanding portions extending at specified reference angles from the upper surface of the templet for checking the desired angles at predetermined locations along the contour of the part anchoring said angle gauges upon the checking surface adjacent and abutting the edge of the templet at specified locations on the templet, said gauges forming a pattern of the surface of the part to be checked, the checking surfaces of the gauges being presented adjacent the edge of the templet and above the upper surface thereof, and placing the part to be checked on top of the templet with the angle of the surface of the part to be checked adjacent said checking surfaces of the gauges, and comparing the contour and angle of the surface of the part in relation to the reference angles of the angle gauges.

4. A method of checking the contour and angle of the surface of a part fabricated from a material which is relatively resistant to magnetization comprising the steps of magnetically anchoring a templet upon a checking surface, said templet having an edge corresponding to the contour of an edge of the part to be checked, magnetically anchoring a plurality of angle gauges upon the checking surface adjacent and abutting the edge of the templet at specified locations on the templet, said gauges forming a pattern of the surface of the part to be checked, the checking surfaces of the gauges being presented adjacent the edge of the templet and above the upper surface thereof, and placing the part to be checked on top of the templet with the angle of the surface of the part to be checked adjacent said checking surfaces of the gauges, and comparing the contour and angle of the surface of the part in relation to the checking surfaces of the angle gauges.

5. A method of checking the contour and angularity of a surface of a part fabricated from a material which is relatively resistant to magnetization comprising the steps of placing a templet upon a platform, said templet having markings thereon to indicate the locations at which the part is to be checked, and having the angles of the surfaces at said locations inscribed in proximity to said markings, selecting gauges having angularly disposed checking surfaces corresponding to the angles marked on the templet, and placing said gauges upon the platform adjacent said corresponding markings on the templet, magnetizing the platform to anchor the templet and gauges to the upper surface thereof, and placing the part to be checked on top of the templet and adjacent said checking surfaces of the gauges to compare the curvature and angularity of the surface of the part, and comparing the contour and angle of the surface of the part in relation to the checking surfaces of the angle gauges.

6. Means for checking the surface and angle of a part comprising a checking surface, a templet adapted to be positioned on said surface, an edge of said templet having a contour which corresponds to an edge of the surface of the part to be checked, and a plurality of angle checking gauges having a base adapted to be positioned on the checking surface along and in abutting contact with the edge of the templet to form a pattern for checking the surface of the part upon said templet and a portion upstanding from the base at a specified reference angle, and means operative to anchor said checking gauges to the checking surface adjacent the edge of the templet, the arrangement being such that the templet and gauges may be set in proper position to form a pattern before the operation of said means to anchor the checking gauges to the surface.

7. Means as set forth in claim 6 including means operative to anchor the templet to the surface.

8. Means as set forth in claim 6 including markings on said templet to indicate the locations at which the part is to be checked.

9. Means as set forth in claim 8 including indicia inscribed on the templet to identify the reference angles of the gauges which are to be stationed adjacent said markings.

10. Means as set forth in claim 6 including a suction line communicating with each of the gauges and templet for anchoring them to the checking surface.

11. Means as set forth in claim 6 wherein the checking surface is magnetized to anchor said gauges thereto.

12. Equipment for checking the surface and angle of a part fabricated from a material which is relatively resistant to magnetization comprising an electromagnetic surface, means for effecting the magnetization and demagnetization of said surface, a templet adapted to be positioned on said surface, said templet having an edge of a contour corresponding to an edge of the surface of the part to be checked, and a plurality of vertically disposed gauges adapted to be positioned on said surface along and in abutting contact with said edge of the templet to form a pattern for checking the surface of a part upon said templet, each of said gauges having a portion upstanding from the top surface of the templet at a specified reference angle, the arrangement being such that the templet and gauges may be set in proper position to form a pattern upon the platform and then magnetically anchored thereto to prevent displacement of the parts forming said pattern.

13. Means for checking the surface and angle of a part comprising a checking surface, a main suction conduit, a plurality of flexible suction lines communicating with the main suction conduit, a templet adapted to be positioned on said checking surface, the templet having an edge with a contour corresponding to an edge of the surface of the part to be checked, a plurality of angle checking gauges adapted to be positioned at predetermined stations on the checking surface along and in abutting contact with the edge of the templet to form a pattern of the contour of the part to be checked, each of said gauges having a portion upstanding from the top surface of the templet at a specified reference angle, coupling means for connecting a gauge to one of said flexible lines, and means forming a communication between said coupling and the base of the gauge, whereby the gauge is anchored in pre-set position by suction.

14. Means as set forth in claim 13 including an opening in said surface communicating with the main suction conduit for anchoring the templet.

15. Means as set forth in claim 14 including cover means for closing said opening when not in use.

16. Means for checking the surface and angle of a part comprising a checking surface, a templet adapted to be positioned on said checking surface, an edge of said templet having a contour which corresponds to an edge of the surface to be checked, and a plurality of angle-checking gauges adapted to be positioned on the checking surface at predetermined locations along the edge of the templet to form a pattern for checking a surface of the part, said gauges each including a base and an upstanding portion, the upstanding portion of the gauge presenting a predetermined selected angle above the upper surface of the templet, the upstanding portions of certain of said gauges serving to facilitate the proper registration of the part to be checked relative to the templet and the angle gauges and the upstanding portions of other of said gauges presenting a gap with the surface of the part to be checked when the part is properly positioned on the templet, said gaps facilitating a check of tolerance at these points.

References Cited in the file of this patent

UNITED STATES PATENTS

| 1,581,566 | Dunbar | Apr. 20, 1926 |
| 2,223,357 | Nahmens | Dec. 3, 1940 |
| 2,323,528 | Faulhaber | July 6, 1943 |
| 2,495,891 | Davis | Jan. 31, 1950 |
| 2,568,817 | Moss | Sept. 25, 1951 |